US 6,532,512 B1

(12) United States Patent
Torii et al.

(10) Patent No.: US 6,532,512 B1
(45) Date of Patent: Mar. 11, 2003

(54) SELECTIVELY COUPLING AN UPSTREAM TERMINAL TO A USB HUB CIRCUIT IN ACCORDANCE WITH A VIDEO SYNC SIGNAL

(75) Inventors: Hiromitsu Torii, Kanagawa (JP); Hirokatsu Yui, Kanagawa (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/384,738

(22) Filed: Aug. 27, 1999

(30) Foreign Application Priority Data

Aug. 28, 1998 (JP) ............................. 10-243154

(51) Int. Cl.[7] .............................. G06F 13/00; G06F 3/00
(52) U.S. Cl. ............................................. 710/316; 710/38
(58) Field of Search .......................... 710/36–45, 305, 710/316, 317

(56) References Cited

U.S. PATENT DOCUMENTS

| | | | | |
|---|---|---|---|---|
| 3,593,302 A | * | 7/1971 | Saito et al. | |
| 5,297,262 A | * | 3/1994 | Cox et al. | 710/36 |
| 5,307,462 A | * | 4/1994 | Hastings | 710/10 |
| 5,499,377 A | * | 3/1996 | Lee | 709/244 |
| 5,561,822 A | * | 10/1996 | Ham | 710/36 |
| 5,621,899 A | * | 4/1997 | Gafford et al. | 710/119 |
| 5,638,521 A | * | 6/1997 | Buchala et al. | 710/131 |
| 5,684,789 A | * | 11/1997 | Habeck et al. | 370/244 |
| 5,721,844 A | * | 2/1998 | Chang | 710/131 |
| 5,938,770 A | * | 8/1999 | Kim | 713/300 |
| 5,978,389 A | * | 11/1999 | Chen | 370/538 |
| 6,073,188 A | * | 6/2000 | Fleming | 710/38 |
| 6,128,743 A | * | 10/2000 | Rothenbaum | 713/300 |
| 6,141,719 A | * | 10/2000 | Rafferty et al. | 710/131 |
| 6,184,919 B1 | * | 2/2001 | Asprey et al. | 348/6 |
| 6,268,845 B1 | * | 7/2001 | Pariza et al. | 345/112 |
| 6,279,049 B1 | * | 8/2001 | Kang | 710/15 |
| 6,308,239 B1 | * | 10/2001 | Osakada et al. | 710/131 |

FOREIGN PATENT DOCUMENTS

EP 10-187303 7/1998

OTHER PUBLICATIONS

Copy of European Search Report. Dated Jan. 18, 2002.

* cited by examiner

Primary Examiner—Sumati Lefkowitz
(74) Attorney, Agent, or Firm—RatnerPrestia

(57) ABSTRACT

A universal-serial-bus ("USB") hub circuit includes a switch circuit connected to a USB hub section and a plurality of upstream terminals each of which is adapted to be connected to computers. The USB hub circuit also includes a selector that operates the switch circuit to couple the USB hub section to a selected upstream terminal. A display device incorporates the USB hub circuit. A video sync signal output by an active host computer coupled to one of the upstream terminals determines which upstream terminal is to be coupled to the USB hub circuit.

3 Claims, 4 Drawing Sheets

SELECTIVELY COUPLING AN UPSTREAM TERMINAL TO A USB HUB CIRCUIT IN ACCORDANCE WITH A VIDEO SYNC SIGNAL

FIELD OF THE INVENTION

The present invention relates to a universal-serial-bus ("USB") hub circuit and a display device to which a plurality of computers can be connected.

BACKGROUND OF THE INVENTION

In recent years, computers have been used in various applications. Some display devices such as those using CRT, LCD, or plasma are connectable to a plurality of computers. For example, a user who operates two computers assigns different jobs to respective computers. In this case, one display device is connected up to these two computers, and the user can select the computer through the display device. Among these smart display devices, some of them include a function for selecting an active computer by detecting signals from the computer.

A display device incorporating a USB hub circuit has drawn attention from the market, and a number of such display devices have increased recently. The USB hub circuit under the common standard with peripheral devices such as a mouse, keyboard and the like is defined as shown in FIG. 4. A USB hub circuit 31 has two types of connections, i.e. one is an upstream terminal 32 for connecting to a computer, and another is a plurality of downstream terminals 33 for USB devices. For instance, when a user connects a USB compatible computer 34 to a display device having a built-in USB hub circuit, the display device is coupled to the computer 34 via the upstream terminal 32. On the other hand, the USB compatible keyboard and mouse 35 are coupled to the display device via downstream terminals 33. This construction allows the keyboard and mouse to be connected directly to the display device that is placed just in front of the computer, i.e. at the user side. Further, this construction advantageously simplifies the connections because the same connecting terminals are used.

The display device incorporating the USB hub circuit 31, however, has the following inconveniences with all the advantages discussed above. Since the USB hub circuit 31 has only one upstream terminal 32, the computer must be re-connected via the upstream terminal 32 to the circuit 31 every time when the user changes the computer. The re-connection annoys the user and wastes time.

SUMMARY OF THE INVENTION

The present invention addresses the problem discussed above, and aims to provide a USB hub circuit and a display device. Through the circuit and device, a computer to be used can be selected with ease.

The USB hub circuit of the present invention comprises the following elements:
 a switch circuit disposed between a plurality of upstream terminals to which respective computers are connected and a USB hub section; and
 a selector for coupling the USB hub section with a selected upstream terminal determined by operating the switch circuit.

A first type display device of the present invention incorporates the above mentioned USB hub circuit.

This construction allows the display device to select a computer to be used only by switching the switch circuit through the selector. Re-wiring between the computer and the USB hub section can be thus advantageously eliminated.

A second type display device of the present invention comprises the following elements:
 a first switch circuit disposed between a plurality of upstream terminals to which respective computers are connected and a USB hub section;
 a second switch circuit disposed between a video display circuit and a plurality of video and sync. signal-input-terminals, and the same computer is connected to respective terminals; and
 a selector for coupling the USB hub section with a selected upstream terminal as well as the display circuit with a selected video and sync. signal-input-terminal by operating the first and second switch circuits.

This construction allows the second type display device to select a computer to be used only by switching the first switch circuit. At the same time, it also allows the second type display device to switch the display screen proper to the computer to be used by the second switch circuit.

A third type display device of the present invention comprises the following elements:
 a first switch circuit disposed between a plurality of upstream terminals to which respective computers are connected and a USB hub section;
 a second switch circuit disposed between a video display circuit and a plurality of video and sync. signal-input-terminals, and the same computer is connected to respective terminals; and
 a controller for identifying an active computer based on the sync. signal supplied through the second switch circuit, and for coupling the USB hub section with the upstream terminal connecting to the active computer by operating the first switch circuit.

This construction allows the third type display device to switch the display screen based on the sync. signal supplied from the active computer, and at the same time, it allows the first switch circuit to couple the active computer with the USB hub circuit.

As discussed above, the first type display device of the present invention allows the switch circuit employing the selector to change the computer. This first type display device thus eliminates the need to re-connect the computer to the USB hub section, and the computer to be used can be selected with ease.

The second type display device of the present invention also allows the first switch circuit employing the selector to change the computer with ease. At the same time, this second type display device allows the second switch circuit to select the display screen proper to the computer to be used.

The third type display device of the present invention selects the display screen based on the sync. signal fed from the active computer, and at the same time, allows the first switch circuit to couple the active computer to the USB hub section. As a result, this third display device can select the active computer automatically, and then operates the display screen as well as peripheral devices. A user thus need not take the trouble to match the display device with the computer to be used.

DETAILED DESCRIPTION OF THE PREFERRED EMBODIMENTS

Exemplary embodiments of the present invention are described hereinafter with reference to the accompanying drawings.

(Exemplary Embodiment 1)

Figure 1:
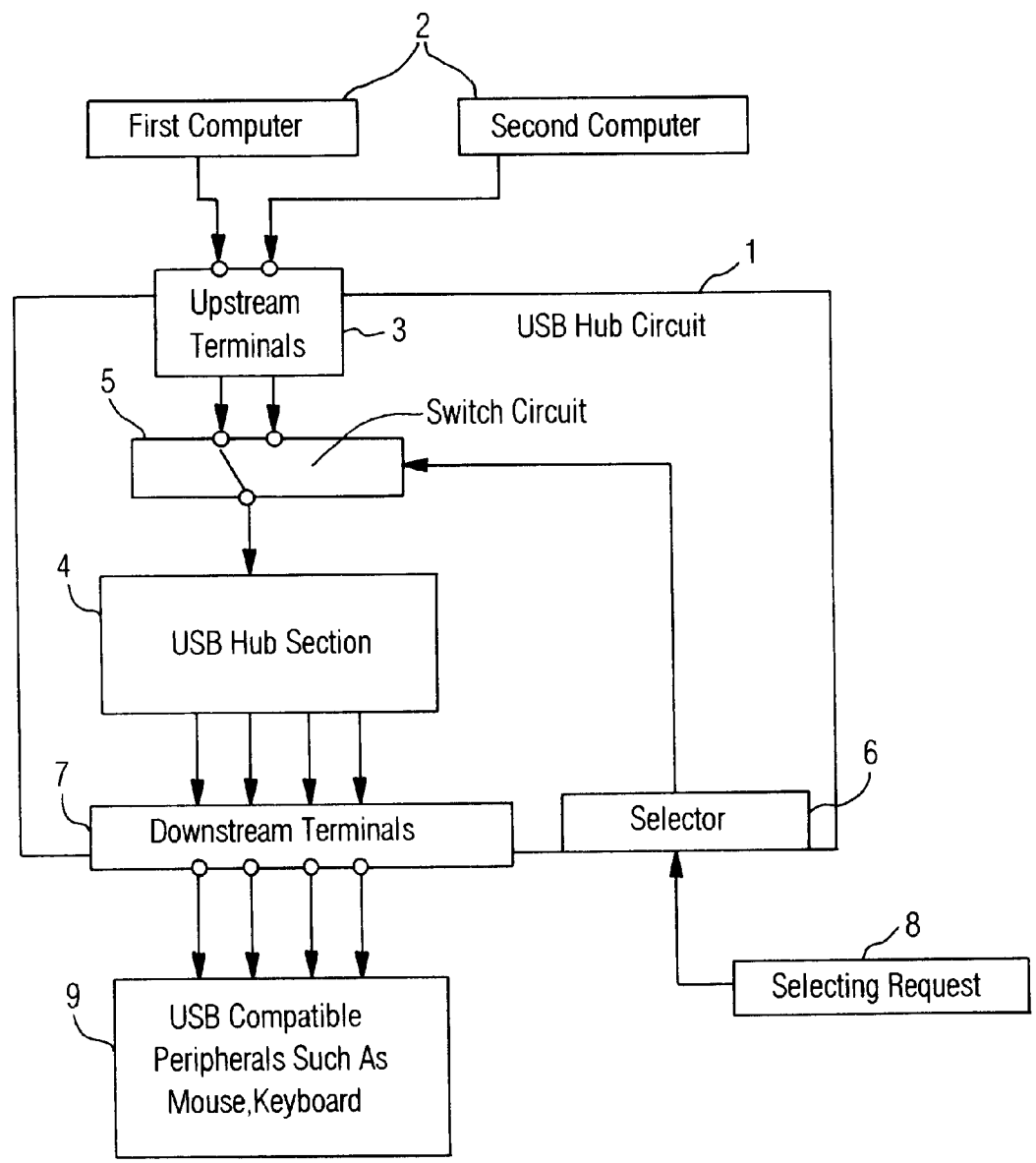
FIG. 1 is a block diagram schematically illustrating a USB hub circuit of a first type display device in accordance with a first exemplary embodiment of the present invention.

FIG. 1 is a block diagram schematically illustrating a USB hub circuit of a first type display device in accordance with a first exemplary embodiment of the present invention. The USB hub circuit 1 shown in FIG. 1 comprises the following elements:

(a) two pieces of upstream terminals 3 connected to two computers 2 respectively;

(b) a USB hub section 4;

(c) a switch circuit 5 disposed between terminals 3 and hub section 4;

(d) a selector 6 for operating a switch circuit 5 responding to a selecting request 8 so that the USB hub section 4 can be exclusively coupled to a selected upstream terminal 3; and (e) a down stream terminal 7 for coupling USB compatible peripherals such as a mouse, keyboard 9 and the like to the USB hub section.

In this embodiment, two computers and thus two upstream terminals are employed; however, the numbers of these elements can be more than two.

The USB hub circuit 1 has been coupled with the two computers 2 with the respective upstream terminals 3 that are coupled to the HUB section 4 via the switch circuit 5. A user selects either one of the two computers 2 before starting a job. The switch circuit 5 is operated by the selector 6. An operation of the selector 6 by a user upon a need drives the switch circuit 5 to operate a switching function, thereby coupling the USB hub section 4 to, e.g. the second computer that is switched from the first computer. Therefore, if respective downstream terminals 7 are coupled to the USB compatible peripherals such as a keyboard and a mouse 9, the user need not take the trouble to re-couple the computer 2 with the USB hub section 4. As a result, the computer 2 to be used can be changed with ease.

The USB hub circuit 1 of the present invention can be integrated into a display device. The display device including the USB hub circuit can effect the same result as discussed above. In other words, the first type display device of the present invention incorporates the USB hub circuit 1 that comprises the following elements:

(a) the switch circuit 5 disposed between the hub section 4 and the plurality of upstream terminals 3 connected to the computers 2 respectively; and (b) the selector 6 for operating the switch circuit 5 responding to a selecting request 8 so that the USB hub section 4 is exclusively coupled to a selected upstream terminal 3.

(Exemplary Embodiment 2)

Figure 2:
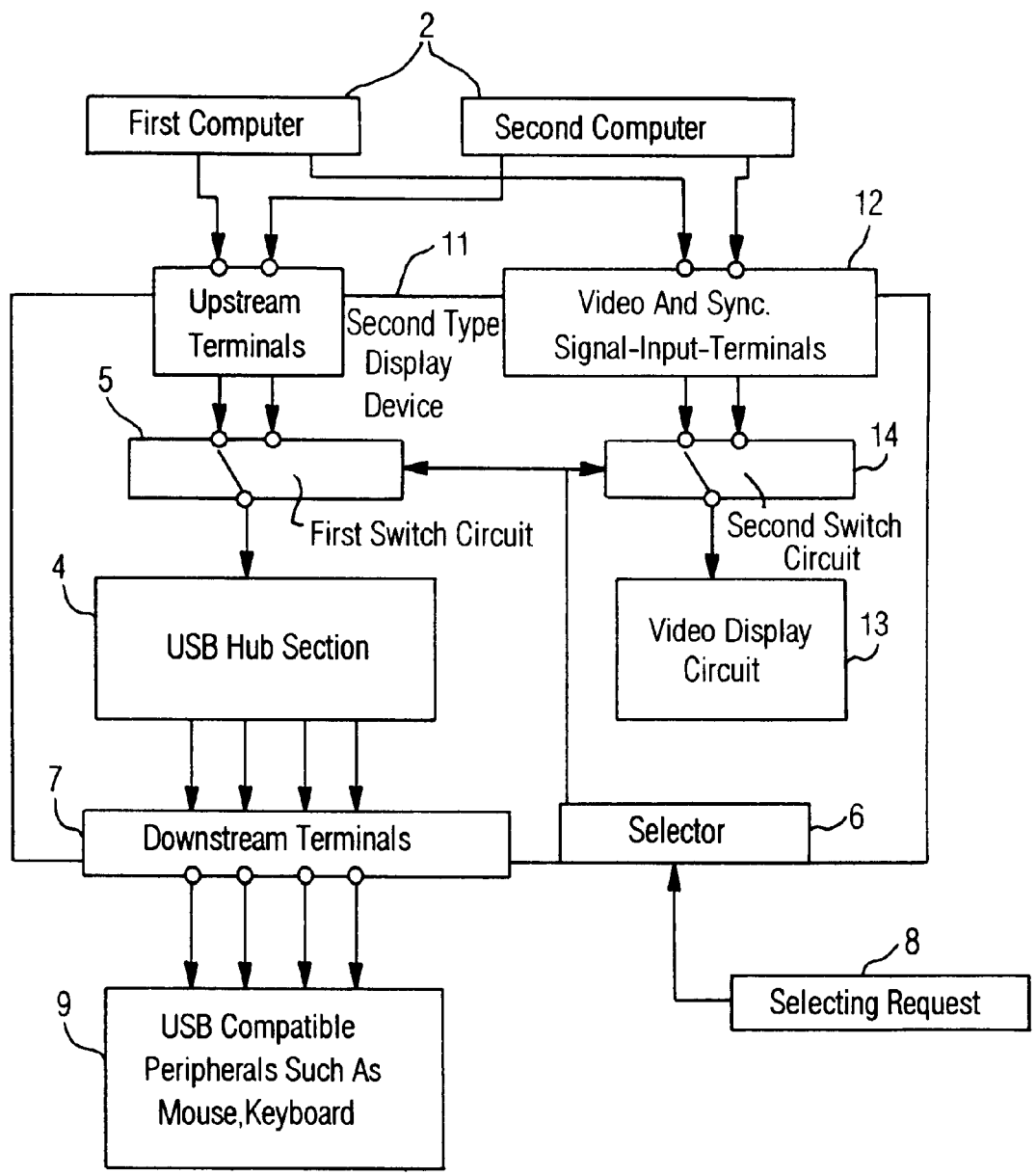
FIG. 2 is a block diagram schematically illustrating a second type display device in accordance with a second exemplary embodiment of the present invention.

FIG. 2 is a block diagram schematically illustrating a second type display device in accordance with the second exemplary embodiment of the present invention. The same elements as shown in FIG. 1 are denoted with the same reference numbers in FIG. 2.

The second type display device 11 comprises the following elements:

(a) two pieces of upstream terminals 3 connected to two computers 2 respectively;

(b) a USB hub section 4;

(c) a first switch circuit 5 disposed between terminals 3 and hub section 4;

(d) two pieces of input terminals 12 receiving video and sync. signals, these terminals are connected to respective computers 2;

(e) a video display circuit 13;

(f) a second switch circuit 14 disposed between the input terminals 12 and the display circuit 13;

(g) a selector 6 for operating the first and second switch circuits 5 and 14 responding to a selecting request 8 so that the USB hub section 4 can be exclusively coupled to a selected upstream terminal 3 as well as the video display circuit 13 can be coupled to a selected video and sync. signal-input-terminal 12; and (h) down stream terminals 7 for coupling USB compatible peripherals such as a mouse, keyboard 9 and the like to the USB hub section 4.

The numbers of computer 2, upstream terminals 3 and video and sync. signal-input-terminals 12 can be three or more.

The second type display device 11 is coupled to the two computers respectively via the upstream terminals 3 and video and sync. signal-input-terminals 12. The upstream terminals 3 are coupled to the USB hub section 4 via the first switch circuit 5. The video and sync. signal-input-terminals 12 are coupled to the video display circuit 13 via the second switch circuit 14. The first and second switch circuits 5 and 14 are selected simultaneously by the selector 6. When a user wants to use the first computer 2, the user operate the selector 6 to work the first switch circuit 5, and then the first computer 2 is coupled to the USB hub section 4. At the same time, the second switch circuit 14 works to couple the first computer 2 to the video display circuit 13. Therefore, if the USB compatible keyboard and the mouse have been coupled to the downstream terminal 7, the second type display device 11 can change the peripherals and display screen only by operating the selector 6. This arrangement eliminates the need to reconnect the computer 2 to the USB hub section 4 or the computer 2 to the video display circuit 13.

(Exemplary Embodiment 3)

Figure 3:
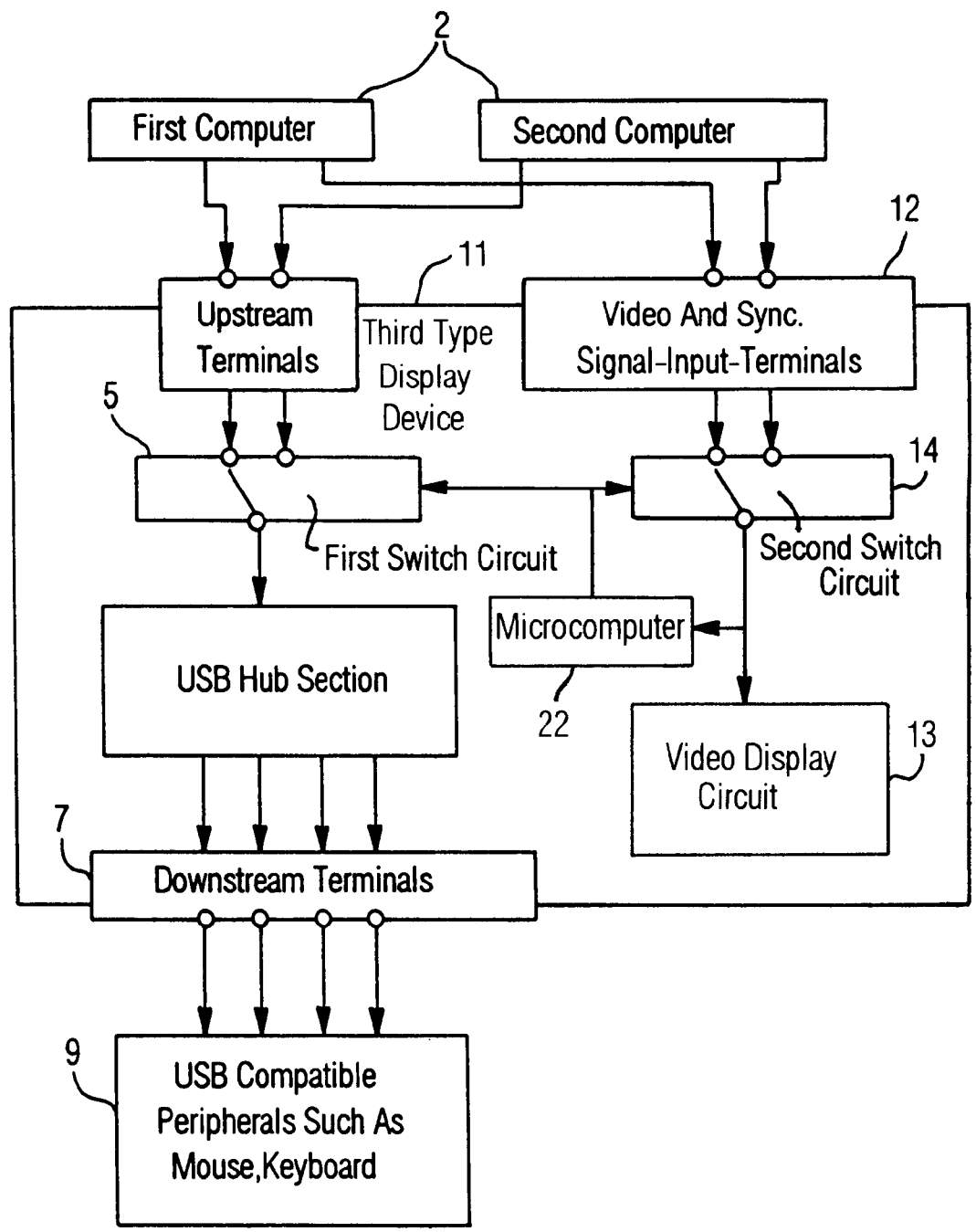
FIG. 3 is a block diagram schematically illustrating a third type display device in accordance with a third exemplary embodiment of the present invention.
Figure 4:
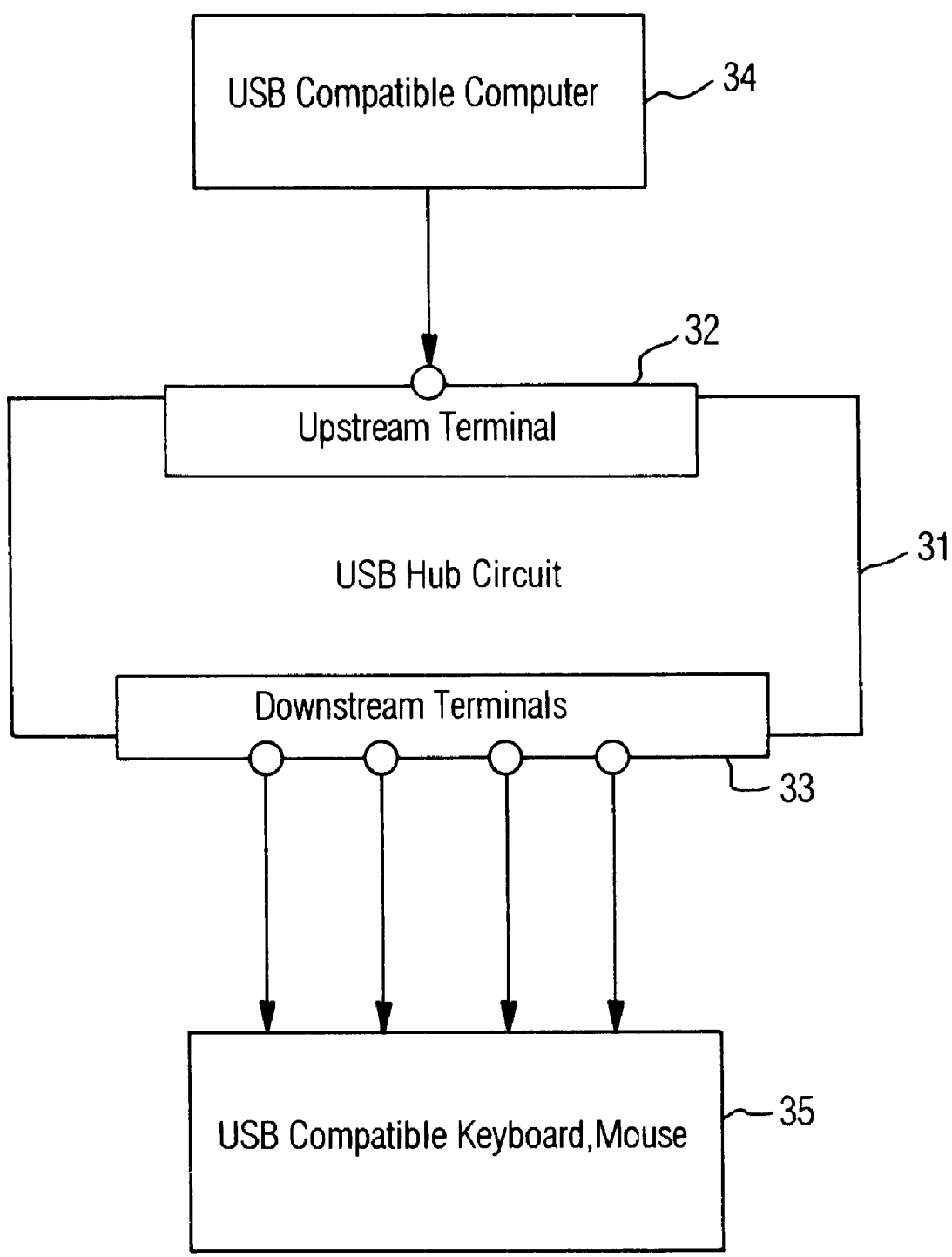
FIG. 4 is a block diagram schematically illustrating a conventional USB hub circuit.

FIG. 3 is a block diagram schematically illustrating a third type display device in accordance with the third exemplary embodiment of the present invention. The same elements used in FIG. 1 and FIG. 2 are denoted with the same reference numbers in FIG. 3.

The third type display device 21 comprises the following elements:

(a) two pieces of upstream terminals 3 connected to two computers 2 respectively;

(b) a USB hub section 4;

(c) a first switch circuit 5 disposed between terminals 3 and hub section 4;

(d) two pieces of input terminals 12 receiving video and sync. signals, these terminals are connected to respective computers 2;

(e) a video display circuit 13;

(f) a second switch circuit 14 disposed between the input terminals 12 and the display circuit 13; and (g) a microcomputer 22 as a controller.

The microcomputer 22 identifies an active computer out of two computers based on a sync. signal supplied through the second switch circuit 14, and couples the upstream terminal 3 connected to the active computer 2 to the USB hub section 4 by switching operation of the switch circuit 5. The USB hub section 4 includes the downstream terminals 7 to which peripherals such as a mouse and a keyboard 9 are coupled. The numbers of computer 2, upstream terminals 3 and video and sync. signal-input-terminals 12 can be three or more.

The third type display device 21 is connected to the two computers via the upstream terminals 3 and video and sync. signal-input-terminals 12. The upstream terminals 3 are coupled to the USB hub section 4 via the first switch circuit 5. The video and sync. signal-input-terminals 12 are coupled to the video display circuit 13 via the second switch circuit 14. This arrangement is the same as that of the second embodiment. When this third type display device 21 is powered on, video and sync. signals supplied from the active computer, e.g. the first computer 2, run through the second switch circuit 14 and enter into the video display circuit 13. The microcomputer 22 thus detects that the sync. signal supplied from the first computer 2 has entered to the display circuit 13.

Then, the microcomputer 22 operates the first switch circuit 5, whereby the USB hub section 4 is coupled to the upstream terminal 3 connected to the active computer 2. In this third type display device 21 having the construction as discussed above, when a display screen is changed based on the sync. signal supplied from the computer 2, the computer 2 is simultaneously coupled to the USB hub section 4 by the switch circuit 5.

If the microcomputer 22 does not detect a sync. signal when the display device 21 is powered on, the microcomputer 22 operates the second switch circuit 14 and selects another computer. The microcomputer 22 repeats the operation of the second switch circuit 14 until it detects the sync. signal. When the microcomputer 22 detects the sync. signal, it determines that the computer supplying the sync. signal is active, and holds the settings of the first and second switch circuits 5 and 14 as they are. In other words, the third type display device 21 having this construction automatically selects an active computer out of plural computers 2, and then works the display circuit 13, the USB compatible keyboard mouse and the like. Thus the process of matching the computer 2 with the display device 21 per se is not required.

The operation discussed above is not limited to when the display device 21 is powered on, but the operation can be practiced arbitrarily upon a user's request. The selector 6 employed in the first and. second embodiments is omitted in the third embodiment; however, the display device can be defined as including the selector 6 so that a user can arbitrarily select one of the computers 2.

What is claimed is:

1. A display device comprising:
   a universal-serial-bus ("USB") hub section;
   a plurality of upstream terminals which are adapted to be connected to computers;
   a first switch circuit connected to the USB hub section and the plurality of upstream terminals;
   a video display circuit;
   a plurality of video and sync. signal-input-terminals which are adapted to be connected to the computers;
   a second switch circuit connected to the video display circuit and the plurality of video and sync. signal-input-terminals; and
   a controller for identifying an active computer based on a signal provided by said second switch circuit, and for connecting the USB hub section to an upstream terminal connected to the active computer by operating said first switch circuit.

2. The display device according to claim 1, wherein the controller is a microcomputer.

3. The display device according to claim 1, wherein the signal provided by said second switch circuit is a sync signal.

* * * * *